No. 781,540. Patented January 31, 1905.

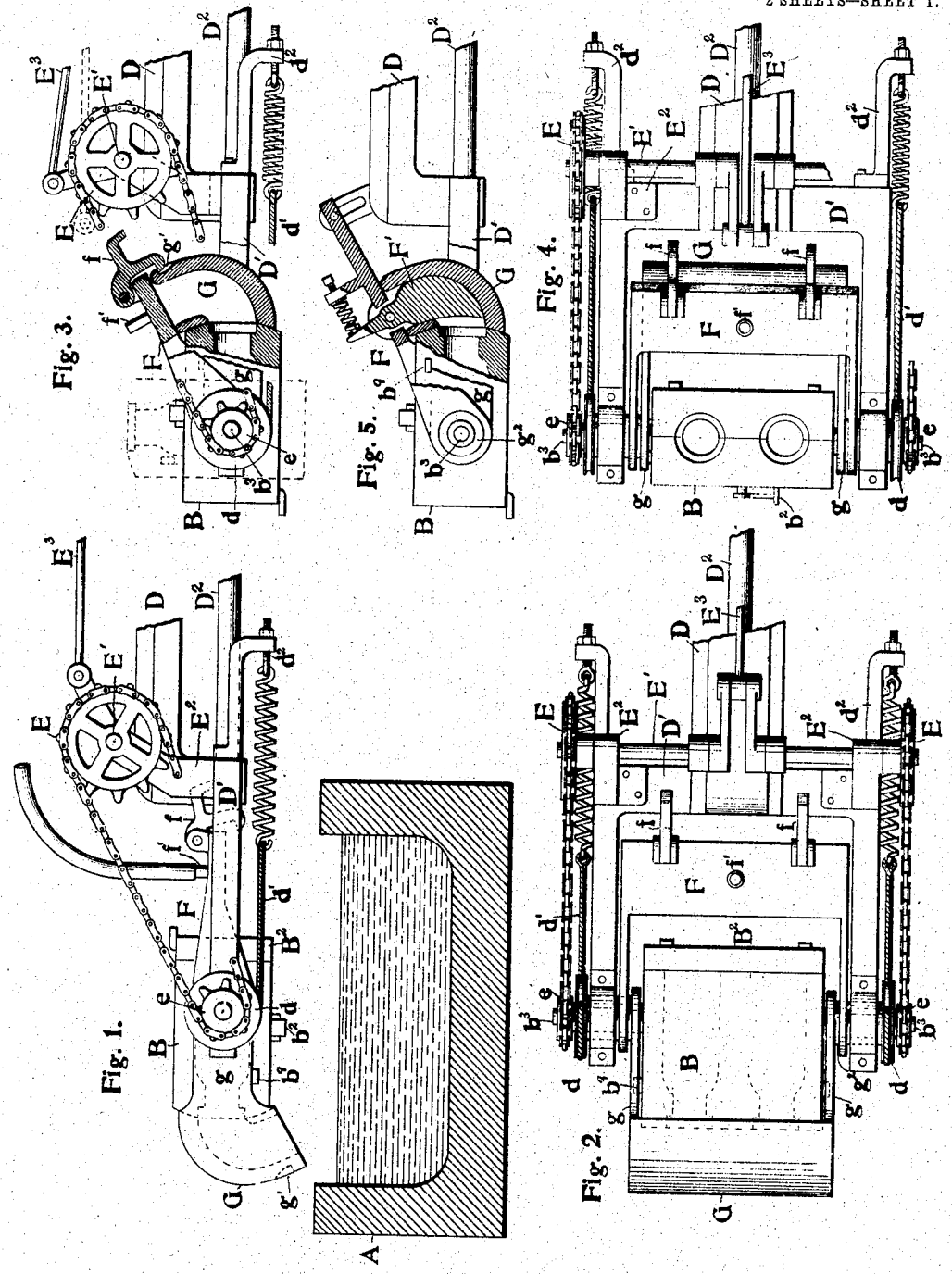

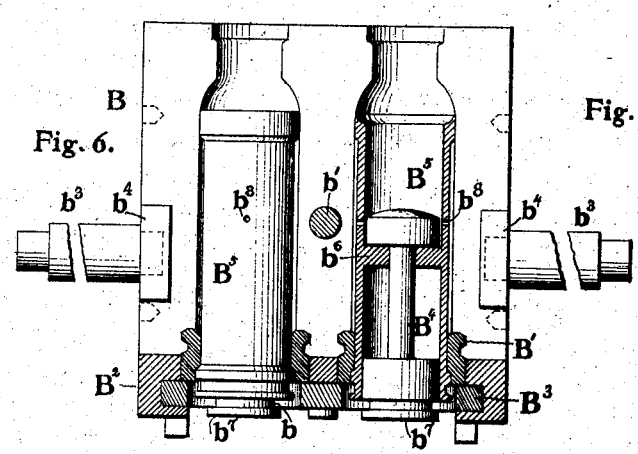
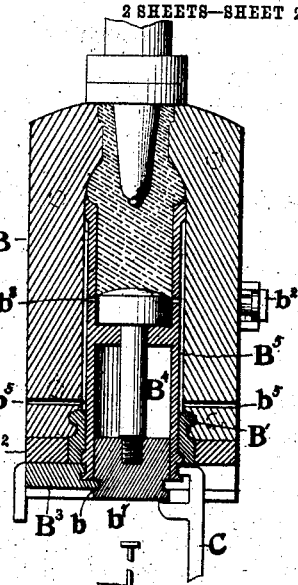
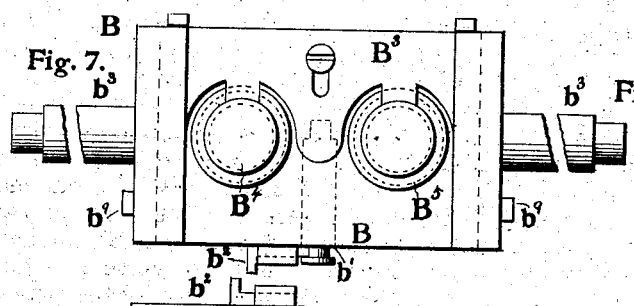
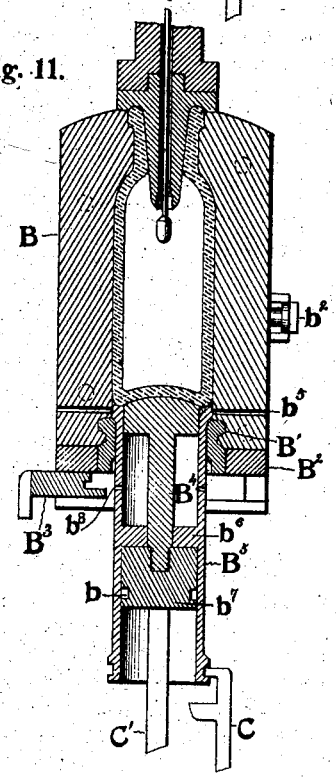
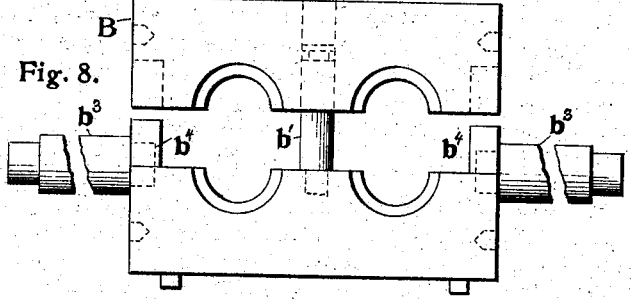
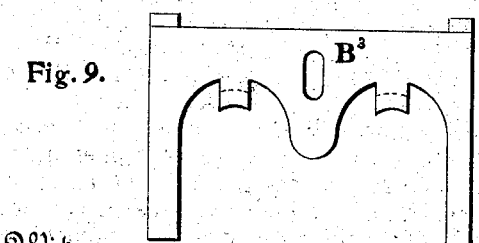

UNITED STATES PATENT OFFICE.

GEORGE A. MARSH, OF SANDUSKY, OHIO.

APPARATUS FOR THE MANUFACTURE OF GLASSWARE.

SPECIFICATION forming part of Letters Patent No. 781,540, dated January 31, 1905.

Application filed February 18, 1904. Serial No. 194,283.

*To all whom it may concern:*

Be it known that I, GEORGE A. MARSH, a citizen of the United States, residing at Sandusky, in the county of Erie and State of Ohio, have invented new and useful Improvements in Apparatus for the Manufacture of Glassware, of which the following is a specification.

My invention relates to improvements in apparatus for the manufacture of hollow glassware, the purpose of the present invention being to provide means for charging the mold from a receptacle containing molten glass, the charge being subsequently shaped in the mold.

In the accompanying drawings, which illustrate my invention, Figure 1 is a side elevation of the mold, its charging means, and mechanism connected therewith, the receptacle for glass being shown in section. Fig. 2 is a plan view of the mold-support, the mold, and the charging means which is carried by the mold-support. Fig. 3 is a side elevation, partly in section, a portion of the mold and its charging means being in section. Fig. 4 is a plan view showing the molds in a vertical position. Fig. 5 is a detail view, partly in section, of a modification. Fig. 6 is a side elevation, partly in section, of the mold. Figs. 7 and 8 are bottom and top views of the mold. Fig. 9 is a detail view of a slide which is carried by the mold. Figs. 10 and 11 are vertical sectional views.

A refers to a receptacle for molten glass which receives its charge from a glass-furnace, and this receptacle is movable to and from the furnace, means being provided for holding the receptacle at a point below the mold and the means for charging the mold with glass taken from the receptacle.

The mold B is made up of two sections, each section being recessed to provide the matrix or article-forming cavity and with recesses to engage collars B', which project from the mold-bottom $B^2$, to which they are attached. The collars in practice will be made in halves and fit snugly in openings in the bottom $B^2$. The bottom is constructed to provide parallel recesses, in which is secured a slide $B^3$, having lugs for engagement with recesses $b$ in the lower ends of followers $B^4$. One of the mold-sections has recesses at its ends and is centrally provided with an aperture for the passage of a bar $b'$, attached to the opposite section of the mold, its end which projects when the sections are together being engaged by a bolt $b^2$, which provides locking means for the sections. One of the sections of the mold has trunnions $b^3$ and guides $b^4$, the guides entering recesses in the opposite section. The ends of the mold have recesses with which suitable means engage for separating the molds when it is desired to remove the finished article, as a bottle, therefrom. The article-forming cavities or matrices of the mold, with the head of the follower $B^4$, determines the exterior configuration of the article, as a bottle, and the mold-sections have vents or openings $b^5$, which lead from the matrix to the outer walls of the mold. Within the matrix of the mold is secured to be in reciprocal engagement therewith a cylinder $B^5$, having near its central portion a transverse partition $b^6$, which is centrally apertured for the passage of the stem of the follower $B^4$, said follower being shaped on its upper surface to form the bottom of the matrix, and its lower end is attached to a guide or disk $b^7$, which is provided with a circumferential recess engaged by a projection or lip on the slide $B^3$. The disk $b^7$ is of such thickness that it will engage sufficiently with the lower portion of the cylinder to insure accurate reciprocatory movement of the follower, and said follower is of slightly less diameter than the internal diameter of the cylinder. In the drawings, Fig. 6 shows the parts assembled to receive the charge. Fig. 10 shows the charge in the mold and the pressing and blowing nozzle inserted in the charge to form the lip and neck of a bottle. Fig. 11 shows the cylinder dropped or lowered and the follower positioned at the upper end thereof, the article being shown blown to shape. The machine which operates in conjunction with the mold has a movable member C, which engages the recess in the lower portion of the cylinder, and a lug to engage the under side of the guide or disk $b^7$. The machine has also a fixed bar or member C' in line with the disk $b^7$ to engage the disk as the cylinder is being lowered, and the apparatus or machine engages the lugs of the bottom $B^3$, as well as the bolt $b^2$, to automatically release the mold-sections and permit a separation thereof. The cylinder $B^5$ is provided with openings or vents $b^8$, which communicate, by means of the space between the cylinder and the matrix, with the apertures or vents $b^5$ and with the atmosphere when the cylinder is lowered. The upper part of the cylinder is shaped to conform with the head of the follower and shape the bottom of the article, and when the cylinder and follower are lowered to the position shown in Fig. 11 the vents $b^5$ will permit the air displaced in blowing the article to completion to escape. After the article is completed the mold-sections are separated by suitable mechanism, and the mold-bottom, with the cylinder, is lowered with the bottle or other article which stands on the follower and upper edge of the cylinder.

D refers to a mold-supporting frame which is attached and forms a part of a mold-manipulating apparatus. This frame includes a yoke D', its side members engaging sleeves $g^2$, through which pass the trunnions $b^3$ of the mold B, and the sleeves beyond the yoke carry disks $d$, with peripheral grooves in which are secured the ends of flexible connections $d'$, the other ends of such connections being attached to springs carried by extensions $d^2$. Beyond the disks and to the outer ends of the trunnions are sprocket-wheels $e$, about which pass chains which engage sprocket-wheels E, mounted on a crank-shaft E', which is supported by members $E^2$ with journals, the supporting members being attached to the yoke D'. The crank-shaft E' is rocked by a rod $E^3$, connected with reciprocating means therefor attached to the machine, of which the mold-supporting frame forms a part.

The trunnions $b^3$ have rigidly attached thereto the sprocket-wheels $e$, and upon said trunnions are sleeves $g^2$, they being journaled near the ends of the arms of the yoke D'. These sleeves $g^2$ $g^2$ near or next to the mold B carry a glass-gathering scoop or dipper G, which is attached to and turns with the sleeves, and loosely journaled on the sleeves there is a frame F, having means for engaging the mold-carrying support. The dipper or gatherer G is shaped at one end to engage during its rotation the open end of the mold B, and when the mold is in substantially a horizontal position this gatherer G will have one of its open ends immediately opposite the matrices of the mold, the side arms $g$ thereof resting upon lugs $b^9$, which project from the mold. The scoop or gatherer G is moved on its support by the flexible connections $d'$ and their springs, which hold the scoop against the lugs $b^9$, and when the mold is moved or turned by actuating the sprocket-wheel the flexible connections hold the scoop and mold so that they will move in unison during a half-revolution of the mold or until the mold reaches a position, as shown in Fig. 3, where it engages with the transverse portion of a frame F, the catches $f$ on said frame automatically engaging recess $g'$ in the scoop. The catches $f$, which are pivotally attached to the frame F, engage the cross-bar D' of the mold-supporting frame E, and this frame has an opening and carries a pipe $f'$, to which is attached a flexible tube for the passage of air under compression for forcing the molten glass from the scoop into the matrices of the mold. The side arms of the frame F may engage a suitable stop carried by the frame D' for arresting the upward movement of the frame and scoop, and it will be noted that after the scoop has been turned the lugs $b^9$ move out of engagement therewith, the mold continuing its movement until it reaches or assumes a vertical position.

As shown in Fig. 5, I have provided means for clearing the scoop from molten glass and forcing the glass into the matrix or matrices of the mold, and in this modified form the frame F is provided with a scraper or plunger F', maintained in pivotal engagement with the frame, and as the scoop moves upward this plunger enters the cavity therein and forces molten glass therefrom. The scraper or plunger may have a spring to admit of a slight movement on the journal, and the extension of the frame engages a slotted arm attached to the mold-supporting frame.

In gathering glass from a receptacle and charging the mold the parts, as illustrated, are preferably positioned as shown by Fig. 1 of the drawings. The frame D having been moved by its attached piston-rod $D^2$ over the receptacle A, which contains molten or plastic glass, the rod $E^3$ being actuated rocks the shaft E' and turns the sprocket-wheels E, the chain engaging and turning the sprocket-wheels $e$ and the mold B, to which said sprocket-wheels are attached. The flexible connections $d'$, attached to the springs and to the disks or sheaves $d$, which are fast on the sleeves $g^2$, hold the scoop against the lugs $b^9$, which project from the mold, and as the mold and scoop are turned on the supporting-frame the open end of the scoop enters the molten glass in the receptacle A, gathers or takes a charge therefrom, the mold and scoop continuing their movement until they have passed from the molten metal and made at least half a revolution or turn on their axis. The open end of the scoop after taking its charge of molten glass from the receptacle engages the transverse portion of the frame F, which closes the open end of the scoop and raises the frame. The latches $f, f$, which are pivoted to the frame F, hold said frame by engaging the transverse portion of the frame D in substantially a horizontal position, and when the swinging frame is engaged by the scoop the latches will hold said frame and scoop in locked engagement. After the charge has been delivered or forced from the scoop into the mold the scoop is held against further upward movement, the mold continuing its movement until it reaches a vertical position, when the supporting-frame for the parts is moved to place the mold upon a blowing-machine, so that the nozzles thereof may enter the matrix and charge. The pressing and blowing nozzle being forced into the neck of the matrix presses the charge which is held therein, in this instance by the cylinder $B^5$ and its follower $B^4$, to form by pressing the lip and neck of the bottle, after which the cylinder and its follower are lowered and the charge is blown to completion to form the body and bottom of the bottle.

It will be particularly noted that the scoop has its delivery end over the contracted and open end of the matrix, which in practice forms the neck of a bottle or like article. Such opening being small by comparison with the body portion of the matrix, the plastic glass will necessarily have to be forced through a contracted opening of less area than the opening beyond, which forms the body of the bottle, and therefore pressure is applied to the charge to force it into the matrix. Many advantages result from charging the mold by pressure from without and through that portion which shapes the neck. For instance, the sections of the mold are closed before being charged and are not open until the article has been completed therein, no neck-sections for holding the parison are used, a definite quantity of glass is always placed in the matrix in a compact mass, and the glass is in a better condition for shaping than if the charge were subjected to more frequent handling or to different temperatures. The pressure or force is applied upon the surface of the charge and may be obtained through the medium of a plunger $F'$, carried by the frame, such plunger forcing by mechanical pressure the charge from the scoop into the matrix or matrices of the mold. The plunger shown clears the scoop of the charge lifted and not needed to fill or charge the matrix. The plunger is preferably pivoted to the frame F and may have a slight movement on its pivot, and the upward movement of the frame F is restrained by pins which engage slotted brackets attached to the frame D. The opening in the scoop extends transversely across the same, and molds constructed may have a single matrix or a plurality, in accord with the size of the articles to be formed therein, it being the purpose of my invention to use molds for forming simultaneously a large number of hollow articles at the same time, and the matrices may be arranged in line with each other or in the segment of a circle. When the charge is forced from the scoop by air under compression, the frame F and the scoop are held in locked engagement by the latches $f$, providing a tight joint between the scoop and its covering-frame F. The air under compression is admitted through a pipe $f'$ upon the surface of the molton glass, and it is obvious that by this arrangement any amount of pressure can be used, said pressure depending upon the consistency of the charge, its quantity, and the area of the opening in the mold through which the charge is forced. The charging of the mold may take place entirely over the receptacle A, and as the mold is moved from the scoop any surplus glass which may have been raised and is not forced into the matrix will fall into the receptacle.

By means of the construction shown glass is ladled or taken directly from a receptacle, the mold itself does not enter the molten glass, and the parts are carried and operated by mechanical means.

Having thus described my invention, what I claim as new, and desire to secure by Letters Patent, is—

1. A separable mold having a scoop maintained in swinging engagement therewith.

2. In a glass-working apparatus, a partible mold, means for holding the sections thereof together, and a scoop carried by and in movable engagement with the mold.

3. In glass-working apparatus, a partible mold, a support therefor, and a scoop attached to the mold to dip molten glass from a receptacle and charge the mold.

4. In a glass-working apparatus, a separable mold, a support with which the mold is maintained in swinging engagement, a scoop which is open at both ends and is held in movable engagement with the mold and means for turning the mold and scoop in unison to charge the mold from a receptacle with molten glass.

5. The combination with a mold, of a scoop attached to the mold, means for moving the mold and scoop in unison and then moving the mold beyond the scoop.

6. The combination of a mold, a scoop pivoted thereto and means for forcing the charge gathered by the scoop into the mold.

7. A mold, a scoop carried thereby, means for forcing the charge from the scoop into the mold and means for moving the mold with its contained charge beyond the scoop.

8. A mold having matrices, a scoop carried by the mold and adapted to simultaneously charge each of the matrices of the mold.

9. A mold, a supporting-frame therefor, a scoop carried by the mold, means for moving the mold and scoop in unison, means for charging the mold from the scoop, and means for moving the mold with its contained charge beyond the scoop.

10. A movable mold-supporting frame, a mold maintained in engagement therewith, means for turning the mold, a mold-charging scoop in swinging engagement with the mold, means for moving the mold and scoop in unison, and arresting the movement of the scoop before the mold reaches the limit of its movement.

11. In combination with a supporting-frame, a mold having trunnions, a scoop having sleeves through which the trunnions pass, sheaves attached to the sleeves and connected with a tension device adapted to raise the scoop, gearing for turning the mold and means carried by the mold for moving the scoop against the movement imparted thereto by the tension device.

12. A mold having trunnions, means for supporting the mold and turning the same on its trunnions, a scoop movable on the same axis as the mold, lugs projecting from the mold to engage the scoop and means for moving the mold beyond the range of movement of the scoop after the charge gathered by the scoop has been delivered into the mold, for the purpose set forth.

13. The combination of a mold, means for imparting a rotary movement thereto, a scoop maintained to turn on the same axis as the mold, and a cover for the scoop, substantially as shown.

14. A partible mold, a cylinder movable in the matrix of the mold and a follower in movable engagement with the cylinder, the upper end of the cylinder and the upper surface of the follower when lowered being in alinement to form the bottom of the matrix of the mold.

15. In a mold for making hollow glassware, a cylinder having an upper end of the same diameter as the matrix of the mold, a follower of less diameter than the internal diameter of the cylinder, and communicating air-passages through the cylinder and the mold.

16. A mold, a cylinder movable in the matrix of the mold, said cylinder having a partition, a follower adapted to rest upon the partition or to be moved to the upper end of the cylinder, and means for moving the cylinder and the follower to the lower end of the mold to form the bottom of the matrix.

17. In combination with the mold having air-vents near its lower portion, a cylinder the major portion being of less diameter than the matrix, and openings through the wall of the cylinder, substantially as shown.

18. A mold having air-vents near its lower portion, a cylinder movable in the matrix of the mold, the exterior of the cylinder below its upper end being of less diameter than the matrix of the mold, a follower maintained within the cylinder and air-passages through the cylinder and the mold, substantially as shown.

19. In a glass-working apparatus, a longitudinally-separable mold, trunnions attached to one of the side sections of the mold, and a scoop which is open at each end mounted on the trunnions.

20. In glass-working apparatus, a two-part longitudinally-separable mold, trunnions which project from one of the sections, and a scoop having side arms which engage the trunnions.

21. In combination with a longitudinally-separable mold in which an article is shaped to final form the open end of the matrix of the mold being of less area than its body portion, a scoop attached to one of the sections of the mold, means for gathering a charge of molten glass in the scoop and delivering the same to the matrix of the mold through its contracted open end.

22. A mold having a bottle-shaped matrix which is open at its end corresponding with the neck and mouth of the bottle, a scoop attached to the mold for gathering a charge of molten glass from a receptacle and delivering the charge into the matrix through its open end by forcing molten glass through the contracted opening by pressure exerted on a body of molten glass held in the scoop over the open end of the matrix.

23. The combination with a mold having a bottle-shaped matrix, a scoop, for taking a charge of molten glass from a receptacle and maintaining the charge over the open end of the matrix, and means for forcing the charge from the scoop into the matrix of the mold through its contracted end, and means for moving the mold when charged beyond the scoop.

24. A mold having an article-forming cavity which is contracted adjacent to its open end, a scoop for taking a charge of molten glass from a receptacle and holding the same over the open end of the mold, and means for forcing the charge from the scoop into the matrix of the mold.

In testimony whereof I have signed my name to this specification in the presence of two witnesses.

GEORGE A. MARSH.

Witnesses:
FRANK S. APPLEMAN,
EUGENE W. JOHNSON.